(12) United States Patent
Bedekar et al.

(10) Patent No.: US 8,929,280 B2
(45) Date of Patent: Jan. 6, 2015

(54) METHOD TO SWITCH BETWEEN NETWORK-CONTROLLED AND MOBILE-CONTROLLED MOBILE IP FUNCTIONALITY

(75) Inventors: Anand S. Bedekar, Arlington Heights, IL (US); Rajeev Agrawal, Northbrook, IL (US); Suresh Kalyanasundaram, Bangalore (IN)

(73) Assignee: Motorola Mobility LLC, Libertyville, IL (US)

( * ) Notice: Subject to any disclaimer, the term of this patent is extended or adjusted under 35 U.S.C. 154(b) by 1768 days.

(21) Appl. No.: 11/757,563

(22) Filed: Jun. 4, 2007

(65) Prior Publication Data

US 2008/0298301 A1    Dec. 4, 2008

(51) Int. Cl.
*H04W 4/00* (2009.01)
*H04W 80/04* (2009.01)

(52) U.S. Cl.
CPC .................................. *H04W 80/045* (2013.01)
USPC ........................................ 370/328; 455/432.1

(58) Field of Classification Search
CPC ..... H04W 8/08; H04W 36/033; H04W 80/04; H04W 80/045; H04L 29/06142; H04L 41/0213; H04L 69/167; H04L 12/2403
USPC .............................. 455/432.1–433, 436–444; 370/331–334, 328, 338
See application file for complete search history.

(56) References Cited

U.S. PATENT DOCUMENTS

| | | | |
|---|---|---|---|
| 2006/0045080 A1* | 3/2006 | Islam et al. | 370/389 |
| 2007/0208855 A1* | 9/2007 | Yegani et al. | 709/225 |
| 2008/0225793 A1* | 9/2008 | Wang et al. | 370/331 |
| 2009/0042569 A1* | 2/2009 | Shaheen | 455/435.2 |
| 2009/0092094 A1* | 4/2009 | Olvera-Hernandez et al. | 370/331 |
| 2010/0011426 A1* | 1/2010 | Falk et al. | 726/7 |

FOREIGN PATENT DOCUMENTS

| | | |
|---|---|---|
| WO | 2004062230 A1 | 7/2004 |
| WO | 2006024141 A1 | 3/2006 |
| WO | 2007051793 A1 | 3/2007 |

OTHER PUBLICATIONS

Yuankui Zhao Shanghai Huawei Technology: "DHCP option for MIP type Decision; draft-zhao-dhc-miptype-00.text", IETF Standard-Working-Draft, Internet Engineering Task Force, IETF, CH, Feb. 25, 2006, pp. 1-12.
Gundavelli K Leung Cisco Systems V Devarapalli Azaire Networks S: "proxy Mobile IPv6; draft-sgundave-mip6-proxymip6-00.txt", IETF Standard-Working-Draft, Internet Engineering Task Force, IETF, CH, Oct. 16, 2006, pp. 1-22.

\* cited by examiner

*Primary Examiner* — George Eng
*Assistant Examiner* — Marcus Hammonds
(74) *Attorney, Agent, or Firm* — Lerner, David, Littenberg, Krumholz & Mentlik, LLP

(57) ABSTRACT

A method for prioritizing Mobile IP between PMIP and CMIP includes the steps of connecting a mobile device (118) to a communication network (102) and determining (308) if the network provides mobility control, such as the network being PMIP-enabled. When it is determined that the network provide mobility control, the mobility function is assigned (312) to the network and is therefore given priority over the mobility function provided by the mobile device. It can be determined (304) that the mobile station also includes a mobility control so that when the network is not PMIP-enabled the mobile station controls (314) layer 3 mobility and the Mobile IP function.

18 Claims, 3 Drawing Sheets

METHOD TO SWITCH BETWEEN NETWORK-CONTROLLED AND MOBILE-CONTROLLED MOBILE IP FUNCTIONALITY

FIELD OF THE INVENTION

The present invention relates generally to mobility control in a wireless communication network and, in particular, to switching between network-controlled and mobile-controlled layer 3 mobility performed by Mobile IP.

BACKGROUND

Mobile Internet Protocol (IP) is a protocol that allows mobile devices such as mobile computers and mobile stations to roam between various networks and sub-networks at various location while maintaining internet or wide area network connectivity. Without Mobile IP or related protocols, a mobile device would not be able to stay connected while roaming between these different networks. This is because the IP address required for any node or device to communicate over the Internet and similar networks is location specific. Each IP address is associated with the particular network or sub-network on which the device resides. This makes it difficult for a device to continue to use the Internet or other networks when the device is mobile. To address this problem, the Mobile IP protocol has been developed and implemented. An implementation of Mobile IP is described in RFC 2002 (and further enhanced in RFC 3344) of the Network Working Group in IETF (Internet Engineering Task Force).

Mobile IP therefore provides a mobility function for the mobile devices. In particular, Mobile IP works with mobility in the layer 3 of communication network protocols. Mobile IP layer 3 mobility can be controlled by either the communication network infrastructure components such as an access node, base station, Proxy Mobile IP client or the like or by the mobile device such as an access terminal. When the network controls the Mobile IP, the capability is referred to as Proxy Mobile IP (PMIP). When the mobile device controls the Mobile IP, the capability is referred to as Client Mobile IP (CMIP). There currently is no protocol within Mobile IP that prioritizes the control of the Mobile IP between the PMIP and CMIP-enabled devices. Thus, there can be conflict between PMIP and CMIP when a CMIP-enabled mobile device operates in a PMIP-enabled network.

Thus, there is a need for a mechanism for prioritizing between CMIP and PMIP when both the network and the mobile device provide at least layer 3 Mobile IP. In addition, there is a need for a mechanism that avoids race conditions between CMIP and PMIP when the mobile device and the network do not have a clear understanding of which of the two is to control Mobile IP functionality. These problems apply as well to client-controlled and network-controlled mobility using protocols different from Mobile IP.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
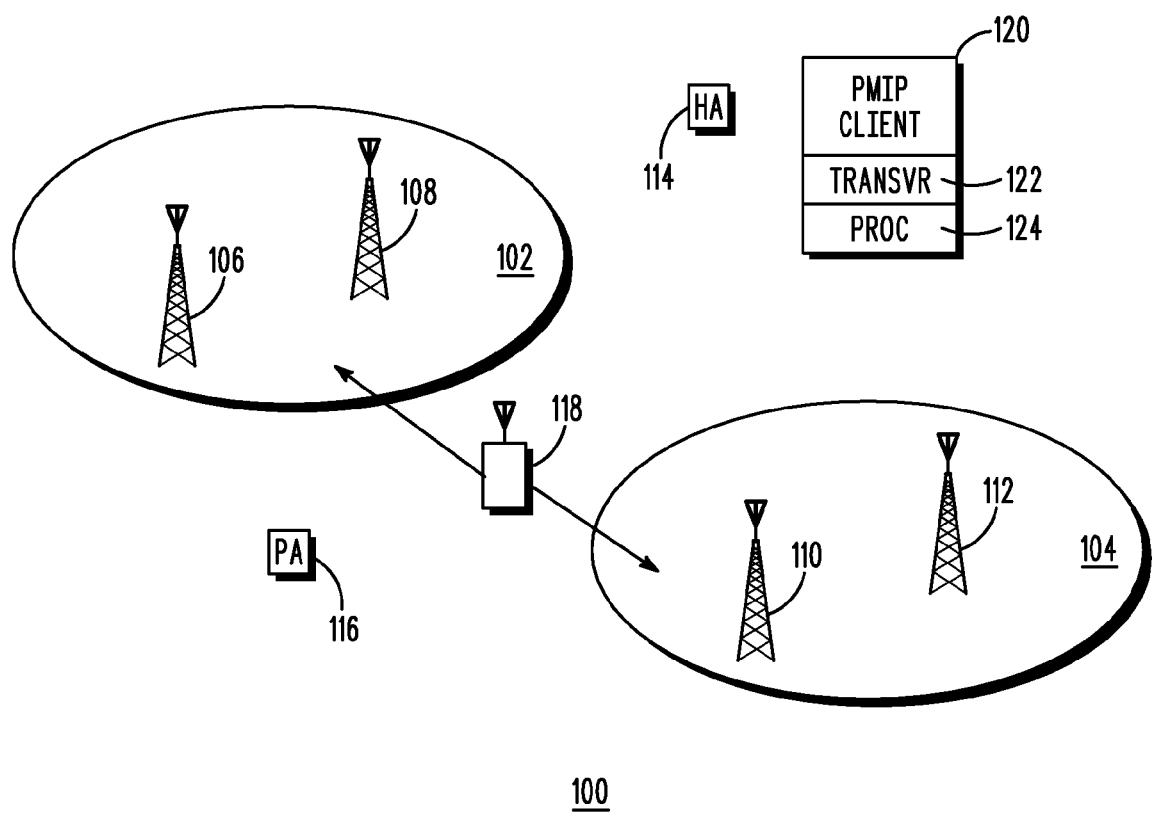
FIG. 1 is a block diagram of various communication networks and a mobile device that operate in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method to switch between a network-controlled and mobile-controlled Mobile IP functionality where PMIP and CMIP may be enabled. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a method to switch between a network-controlled and mobile-controlled Mobile IP functionality where PMIP and CMIP may be enabled described herein. The non-processor circuits may include, but are not limited to, a radio receiver, a radio transmitter, signal drivers, clock circuits, power source circuits, and user input devices. As such, these functions may be interpreted as steps of a method to perform a switch between a network-controlled and mobile-controlled Mobile IP functionality where PMIP and CMIP may be enabled. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present disclosure describes and provides a method that prioritizes between a PMIP and CMIP when both the network and the client are Mobile IP enabled. This described prioritization enables the PMIP-enabled network to advertise its presence and capability to the mobile device and enables the transfer of control of mobility provided by Mobile IP and relevant parameters to the Mobile IP-capable agent of the network that can perform PMIP. The present disclosure also provides the ability for the mobile device to transfer control of mobility back to the mobile device if the network no longer provides PMIP or under other circumstances.

Accordingly, a method for prioritizing Mobile IP between PMIP and CMIP includes the steps of connecting a mobile station to a communication network and determining if the network provides mobility control, such as the network being PMIP-enabled. When it is determined that the network provides mobility control, the mobility function is assigned to the network and is therefore given priority over the mobility function provided by the mobile device. To determine if the network provides mobility control, the network can send to the mobile devices a network mobility control capability announcement. The announcement can be sent by an access point, PMIP client or home agent operating within the network. In an embodiment, the network can send a mobility request message to the mobile devices, which can respond with an acknowledgment. With the acknowledgment, the mobility function is assigned to the network. In another embodiment, it can be determined that the mobile station also includes a mobility control so that when the network is not PMIP-enabled the mobile station controls layer 3 mobility and the Mobile IP function. When the mobile device moves from one network to another network, mobility control is reclaimed by the mobile device and the mobility function can be assigned to the second network if it is PMIP-enabled. The mobility control described can be anchored in a home agent that serves the CMIP-enabled mobile device and the PMIP-enabled network.

In separate embodiment, a method to prioritize between CMIP-enabled devices and PMIP-enabled networks includes connecting the mobile device to the network and determining that the network is a PMIP network. As the network is PMIP-enabled, the mobility control is assigned to the network so that the mobile device can take advantage of having the network control this layer 3 function. The present invention also includes a method where the CMIP-enabled device is connected to a network. It is then determined if the network also provides mobility control and is therefore PMIP-enabled. Priority to control mobility is then given to the network to partake in the advantages provided over multiple mobile devices controlling mobility.

Turning to FIG. 1, a block diagram of a communications system 100 is provided. The system 100 includes a first communication network 102 and a second communication network 104. The networks can be any of the known types of 2G, 3G and 4G networks including but not limited to Code Division Multiple Access (CDMA), Global System of Mobile Communication (GSM), Wideband CDMA (W-CDMA), CDMA2000, Universal Mobile Telecommunication System (UMTS), Orthogonal Frequency Division Multiplexing (OFDM), Worldwide Interoperability for Microwave Access (WiMax), Long-Term Evolution (LTE) and other communication technologies. Each of the networks can include devices such as access points 106-112, home agent 114, foreign agent 116, mobile devices 118 and PMIP clients 120. Access points 106-112 can be base stations or access nodes that transmit and receive signals to and from mobile devices such as cellular phones, portable computers, laptop computers, personal digital assistants (PDAs) and other devices operating with the networks. In addition, the access points 106-112 transmit and receive signals between different access points and network infrastructure components (not shown) that provide wireless communication to the mobile devices operating within the networks. An actual communication network may be significantly more complex and may include various additional known entities, such as base station controllers, billing, authorization, authentication and voice mail servers that are not directly relevant to this description. It is possible that neighboring networks 102 and 104 can operate using the same or different communication technologies. The access points 106-112 may also communicate with each other or with other access points using an IEEE 802.16 based wireless metropolitan area network or other technologies.

In an embodiment, the first network 102, which can be a WiMax network, can be PMIP-enabled and capable network while the second communication network 104 is not PMIP-enabled. If the network is PMIP-enabled, the network may have sets of keys (e.g. cryptographic keys) to secure communications with a home agent, described below, using PMIP mode. The principles described apply even if the second communication network 104 is PMIP-enabled. It is understood that the home agent 114 can reside within the system or specifically within either of the first network 102 and the second network 104 as one of the components used in mobility. The home agent is typically a router on a home network of mobile devices that tracks the location of mobile devices that are affiliated with the network and that tunnels the packets that are being sent to a mobile device when the mobile device is in a network other than its home network. Networks 102, 104 can also include a foreign agent 116. The foreign agent 116 is typically a router on mobile device's visited network (i.e., a foreign network that is not the mobile device's home network) that provides routing services to the mobile device upon the mobile device registering with the foreign agent. The foreign agent 116 delivers packets to the mobile device that were tunneled by the home agent.

Mobile device 118 operates within system 100 and, for example, can originate a communication session within first network 102, operating as the home network 102. As device 118 is mobile, it can roam from the home network to the second network 104, operating as visiting network 104. In other embodiments, both the network 102 and network 104 may operate as visiting networks, with a separate network (not shown) operating as the home network. Home agent 114 and foreign agent 116 may be used to transfer packets between the home network and the visiting network. In an embodiment, the mobile device 118 can be CMIP-enabled and therefore has security keys and relevant parameter to be in-charge of mobility control for CMIP mode. In addition, the network and the mobile device can use the same keys for PMIP and CMIP, or they may use different keys.

Mobility is understood to be the determination of the location of a mobile device within a network and with the access points 106-112 within the networks. Mobility is controlled and managed in layer 3 of the communication protocols described. In addition, mobility functions can be controlled by a CMIP-enabled mobile device or a PMIP-enabled network. In an PMIP-enabled network, a PMIP client 120 can be provided to provide the PMIP functions. The PMIP client 120 includes a transceiver 122 that transmits and receives signals from the networks 102, 104, the base stations 106-112 and the mobile station 118. The PMIP client 120 includes a processor 124 that provides the mobility function, discussed below, for the network. When a CMIP-enabled mobile device operates in a PMIP-enabled network, a prioritization scheme is described so that the mobility functions can be appropriately handled and conflicts between the Mobile IP functions are avoided. The mobility prioritization schemes described operate when only the mobile device or the network has Mobile IP functions, or when they both have Mobile IP functions.

Figure 2:
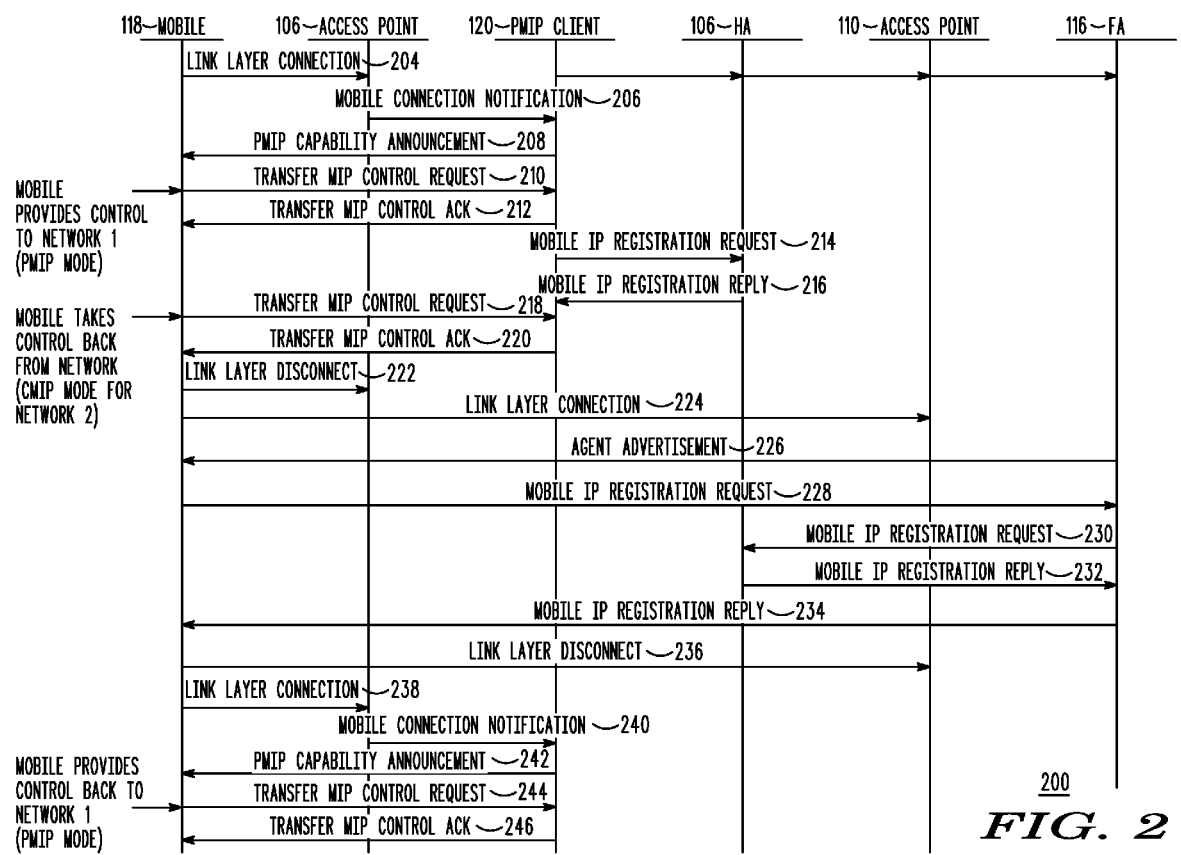
FIG. 2 is a call flow diagram of a mobile device operating in various communication networks in accordance with some embodiments of the present invention.

FIG. 2 is a call flow diagram 200 for a mobile device 118 operating in networks 102, 104 where Mobile IP functionality is to be prioritized and assigned between a network and mobile device. The call flow operates as mobile device 118 operates in first network 102. While in the first network 102, the mobile device sends and receives messages with at least one access point 106 that is a part of first network 102. In addition, messages are sent between a PMIP client 120 that operates in the first network 102 and other devices operating in the networks. The PMIP client can operate on a stand alone server within the network 102 or can reside on an access point, such as access point 106, within the network. The home agent 114 also sends and receives messages as a part of the call flow of the Mobile IP prioritization described. To begin, the mobile device 118 establishes 204 a link layer connection with access point 106.

In an embodiment, network 102 is Mobile IP enabled and thus has a functional entity called a PMIP client 120 operating in the network. A mobile device connection message is sent 206 to the PMIP client 120 notifying the mobility function handled by the PMIP client that a mobile device 118 is now operating on the network 102. The PMIP client sends 208 a PMIP capability announcement to the mobile device 118. This announcement notifies the mobile device 118 regardless of the fact that the mobile device is a CMIP-enabled device that network 102 is PMIP capable. When the mobile device 118 is informed that the network 102 is PMIP-enabled, the mobile device sends 210 a transfer MIP control request to the PMIP client 120, assigning the mobility function to the PMIP client in the network. The PMIP client 120 responds 212 with an acknowledgement in the form of a transfer MIP control acknowledgment. The relevant parameters for the transfer of Mobile IP functionality can be provided during the exchange of the control request message and the acknowledgment message. In an embodiment, the address of the PMIP client 120 can be advertised in the PMIP capability announcement message. Alternatively, mechanisms similar to home agent discovery can be used for PMIP client discovery.

Upon being assigned the mobility function, the PMIP client 120 sends 214 a Mobile IP registration request to the home agent 116, which responds 216 to the PMIP client 120 with a Mobile IP registration reply. At this point, Mobile IP functionality is controlled by the PMIP client and both the network 102 and mobile device 118 rely on the PMIP client 120 to control the layer 3 mobility according to known protocols.

In an embodiment, the mobile device 118 may need to reclaim control of mobility and Mobile IP function and rely on its CMIP capabilities. For example, the mobile device may be roaming from first network 102 to second network 104, or issues may arise with the PMIP client 120 in network 102. The mobile device 118 therefore sends 218 a transfer MIP control request message to the PMIP client 120, in order to reclaim control of the mobility function. The client 120 responds 220 to the request message with a transfer MIP control acknowledgment message. As Mobile IP control resided with the PMIP client, the transfer request causes the PMIP client 120 to transfer Mobile IP control to the mobile device, which is CMIP-enabled. Accordingly, the mobile device takes over the functions of Mobile IP from the network 102.

In the embodiment where the mobile device 118 roams from first network to second network, the mobile device can send 222 a link layer disconnect message to the access point 106. After the mobile device 118 has roamed into the second network, which is assumed to be not PMIP-enabled, the mobile device sends 224 a link layer connection to an access point 110 in the second communication network 104. As the mobile device has roamed into the second network, the foreign agent 116 sends an agent advertisement to the mobile device 118. In the case when the mobile device 118 is CMIP capable, a Mobile IP registration request is sent 228 from the mobile device 118 to the foreign agent 116. As the mobile device 118 has roamed into a visiting network, the negotiation of the Mobile IP can be between the foreign agent 116 and the home agent 114. Accordingly, the foreign agent sends 230 a Mobile IP registration request to the home agent 114 operating for network 102. The home agent responds 232 with a Mobile IP registration reply. The foreign agent also sends 234 a Mobile IP registration reply to notify the mobile device 118 that the Mobile IP registration is successfully completed, and henceforth the packets meant for the mobile device will be tunneled from the home agent to the foreign agent, which will then deliver it to the mobile device.

After being in a visiting network, the mobile device can roam into another visiting network (not shown). The foreign agent operating for the other visiting network will negotiate with the home agent 114 as described. In another embodiment, the mobile device 118 can return to the first network 102. Upon leaving the second network 104, the mobile device 118 sends 236 a link layer disconnect message to access point 110 and sends 238 a link layer connect message to access point 106 in the first communication network. As stated above, the access point contacts 240 the PMIP client 120 operating on the network with a mobile connection notification message. The PMIP client sends 242 a PMIP capability message to the mobile device 118. To transfer control of mobility to the network, the mobile device 118 sends 244 a transfer Mobile IP control request to the PMIP client 120, which responds 246 with the appropriate acknowledgment.

Figure 3:
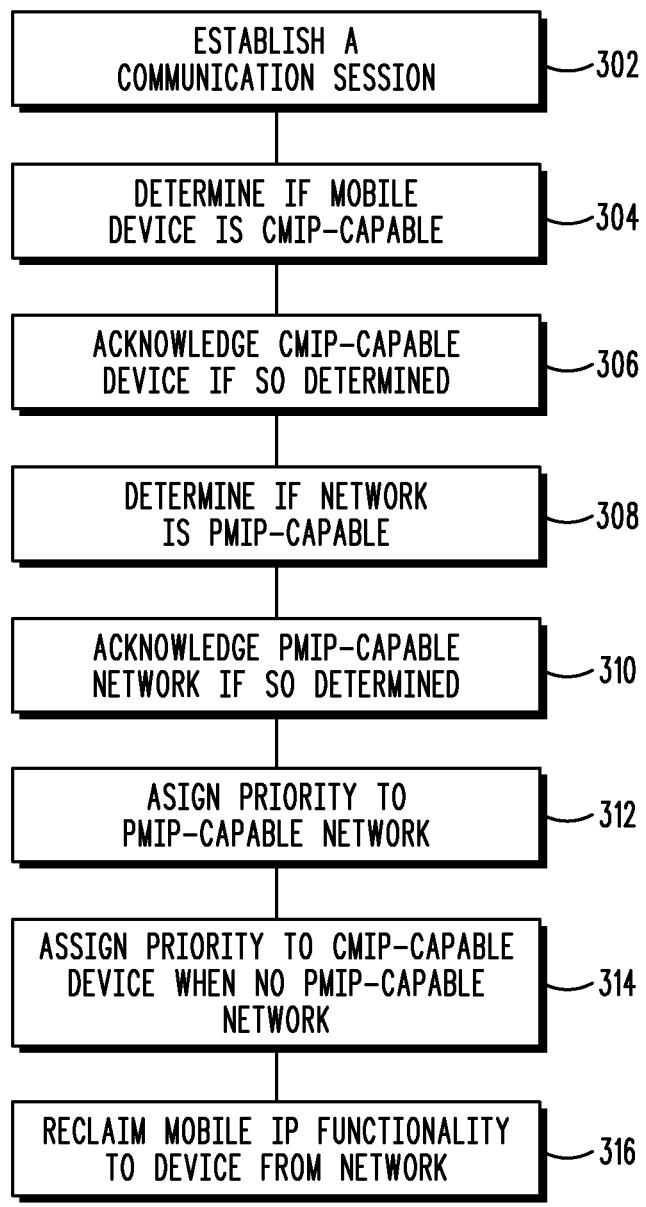
FIG. 3 is a flow chart of the determination of the prioritization of a proxy Mobile IP enabled communication network and a client Mobile IP enabled mobile device in accordance with some embodiments of the present invention.

FIG. 3 is a flow chart illustrating the method 300 of assigning Mobile IP priority. The method begins with the mobile device 118 establishing 302 a communication session with an access point 106, 108 in the first communication network 102. The network and the mobile station determine 304 if the mobile device 118 is a CMIP capable device and is therefore capable of performing Mobile IP functions. This can be determined by the mobile device 118 broadcasting a message to the network 102 that it is CMIP capable. In an embodiment, the network can acknowledge 306 that the device is CMIP capable. The network and the mobile station also determine 308 if the network 102 is PMIP capable and is therefore capable of performing Mobile IP functions. This can be determined by the network 102 broadcasting a message to the mobile device that it is PMIP capable. In an embodiment, the mobile can acknowledge 310 that the network is PMIP capable.

To take advantage of the network PMIP capabilities, priority is given 312 to the network when the network is PMIP capable and Mobile IP functionality is assigned to the network. The advantages of giving priority to PMIP capable network include, but are not limited to, reduced over-the-air signaling and messaging, optimization of handover latency and privacy. As described, the home agent of the network 102 assigns the Mobile IP control to the PMIP-enabled network. As a mobile device roams between different networks, one common home agent 114 of the first network can be used to anchor the mobility function. This anchor home agent can be used regardless of whether the mobility is controlled by either the network or the mobile device.

When the network is not PMIP capable, Mobile IP functionality is assigned 314 to the mobile device 118. The mobile device 118 can reclaim 316 Mobile IP functionality from the network 102 when the mobile device roams into a second network or when then network cannot perform the Mobile IP functions for various reasons. In the situation when the mobile device roams into the second network, a negotiation between the mobile device 118 and the visiting network can be performed to prioritize and assign the Mobile IP function. As stated, when the visiting network is PMIP capable, priority is granted to the network.

As can be understood from the foregoing, the prioritization and assignment of Mobile IP to a PMIP-enabled network can be performed in different situations. For examples, the principles described operate where there is inter-technology mobility of a Mobile IP capable mobile device between a network with no support for PMIP, such as 1X EV-DO network, and a PMIP capable WiMax network. In this example, the mobile device should be able to use the PMIP in the WiMax network and the CMIP in the 1X EV-DO network. In a collateral example, the principles described operate where there is inter-technology mobility, such as in a WiMax network, of a MIP capable mobile device operating between a PMIP capable WiMax network and a PMIP-incapable WiMax network. In addition, the principles described function in race conditions that arise when a mobile device moves from a first PMIP-enabled network to a second PMIP-enabled network, when a mobile device regains control of mobility functionality from the PMIP-enabled network and when the mobile hands over control to a second PMIP-enabled network from a first PMIP-enabled network.

In view of the foregoing description, the principles described can be used when both the mobile device 118 and the PMIP client 120 send updates to the same home agent 114 regarding mobility capabilities therefore creating a race conditions regarding who has mobility control when Mobile IP registration messages are received. For example, a mobile device may initially be in a PMIP capable network where PMIP client has performed a Mobile IP binding update with the home agent. The mobile device then switches to a non PMIP-capable network, such as CDMA network, and does CMIP binding updates. While the mobile is receiving data from the non-PMIP network, the "lifetime" of the PMIP client's binding update expires so that the PMIP client sends a new binding update to the home agent 114. The home agent can then switch the tunnel for the mobile device to the PMIP-enabled network and away from the non-PMIP network where the mobile device is receiving data. This may cause a service interruption for the mobile device in the PMIP network. The prioritization of the PMIP-enabled network over the CMIP-enabled device can avoid this interruption by consistently providing a hierarchy of what device performs Mobile IP functionality.

In another example, the mobile device 118 can enter idle mode in a first PMIP-enabled network and then wake up in a second PMIP-enabled network. At wake-up the PMIP client in the second network performs a Mobile IP update to receive data while the mobile device continues to remain in the idle mode in the first PMIP-enabled network. The PMIP client 120 in the first network may perform a Mobile IP update (either because the lifetime of its earlier binding expired or because the mobile device in idle mode performed a location update in the first network). This Mobile IP update would cause the data path to be switched away from the second network where the mobile device is operating, which also leads to a service interruption. The prioritization of one PMIP-enabled network over another PMIP enabled network can avoid this interruption by consistently providing a hierarchy of what device or network performs Mobile IP functionality.

It may be noted that in some embodiments, the decision of whether to give priority to the PMIP capable network or to the mobile device may be based on more complicated factors than those described above. Such factors could include the load on the network, the subscription class of the mobile device or user, the capacity of the wireless link connecting the mobile device to the network, the mobility pattern of the device, the quality of service requirements of the device or of specific applications running on the device, the need for location privacy, the frequency with which the device performs handover to another network, and so on.

It may also be noted that the various messages described herein, such as mobility capability announcement messages, mobility function assignment messages, and the like, may manifest in various forms. For example, a message may be a separate standalone message that is transmitted separately from any other messages. Alternatively, a message may be a piece of information embedded inside another message that contains other pieces of information.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
connecting a mobile station to a first network wherein the first network is one of a client mobile internet protocol (CMIP) where the mobile station controls the IP and a proxy internet protocol network (PMIP) where the network controls the IP and wherein the mobile station can be a CMIP-enabled mobile station and is capable of connecting to a PMIP network;
when the mobile station roams between a CMIP network and a PMIP network: determining if the first network provides the capability of mobility control;
when the first network is determined to provide the capability of mobility control, providing a network mobility control capability announcement to the mobile station;
determining if the mobile station provides the capability of mobility control; and
when the mobile station is determined to provide the capability of mobility control,
providing a mobile station mobility control capability announcement to the network, wherein control of mobile IP is prioritized such that when the mobile station is CMIP-enabled and is connected to a network that is PMIP-enabled mobile IP is controlled by the network, and when the mobile device is connected to a network that is PMIP-enabled and moves to another network that is PMIP-enabled, mobility control is reclaimed by the mobile device and then assigned to the another network.

2. The method according to claim 1 further comprising assigning a mobility function to the first network when it is determined that the first network provides the capability of mobility control.

3. The method according to claim 2 wherein assigning a mobility function comprises sending by one of the mobile station and the first network a mobility function assignment message to the other of the mobile station and the first network.

4. The method according to claim 2 further comprising reclaiming mobility control from the first network by the mobile station.

5. The method according to claim 4 wherein reclaiming mobility control from the first network comprising at least one of
reclaiming when the mobile station has connected to a second network, and
reclaiming in anticipation of the mobile station connecting to a second network.

6. The method according to claim 4 wherein reclaiming mobility control from the first network comprising providing at least one parameter used for the operation of the mobility function.

7. The method according to claim 2 wherein assigning the mobility function involves sending a mobility registration message to a home agent serving the mobile station and the network.

8. The method according to claim 2 wherein assigning a mobility function to the first network comprises providing by at least one of the mobile station and the first network to the other of the mobile station and the first network at least one parameter used for operation of the mobility function.

9. The method according to claim 1 further comprising:
determining if a second network provides the capability of mobility control, wherein the second network is one of a CMIP network and a PMIP network, and at least one of:
assigning a mobility function to the mobile station when it is determined that the second network does not provide the capability of mobility control,
assigning a mobility function to the second network when it is determined that the second network provides the capability of mobility control, and
providing, between the mobile station and the second network, at least one parameter used for the operation of the mobility function.

10. A method comprising:
connecting a mobile station to a network wherein the network is one of a client mobile internet protocol (CMIP) where the mobile station controls the IP and a proxy internet protocol network (PMIP) where the network controls the IP and wherein the mobile station can be a CMIP-enabled mobile station and is capable of connecting to a PMIP network;
determining if the network provides mobility control;
determining if the mobile station provides mobility control; and
prioritizing the network to provide mobility control when it is determined that the network and the mobile station provide mobility control when the mobile station roams between a CMIP network and a PMIP network,
wherein control of mobile IP is prioritized such that when the mobile station is CMIP-enabled and is connected to a network that is PMIP-enabled mobile IP is controlled by the network, and
when the mobile device is connected to a network that is PMIP-enabled and moves to another network that is PMIP-enabled, mobility control is reclaimed by the mobile device and then assigned to the another network.

11. The method according to claim 10 wherein prioritizing the network comprises sending by one of the mobile station and the first network a mobility function assignment message.

12. The method according to claim 10 further comprising reclaiming mobility control from the first network by the mobile station by sending a message from the mobile station to the first network.

13. The method according to claim 12 wherein reclaiming mobility control from the first network comprising at least one of
reclaiming when the mobile station has connected to a second network, and
reclaiming in anticipation of the mobile station connecting to a second network.

14. The method according to claim 10 further comprising:
determining if a second network provides the capability of mobility control; and
assigning a mobility control function to the second network when it is determined that the second network provides the capability of mobility control.

15. An apparatus comprising:
a transceiver to send and receive messages, and
a processor coupled to the transceiver wherein the processor makes determination of mobility control capabilities when a mobile station roams between a client mobile internet protocol (CMIP) network and a proxy mobile internet protocol (PMIP) network and wherein the processor assigns a mobility control function to a PMIP network when it is determined that the first network is capable of providing mobility control and provides a network mobility control capability announcement to the mobile station when the mobile station roams into the CMIP network and wherein the mobile station can be a CMIP-enabled mobile station and is capable of connecting to a PMIP network,
wherein the processor assigns a mobility control function to the mobile station when it is determined that the mobile station is capable of providing mobility control and provides a mobile station mobility control capability announcement to the network,
wherein control of mobile IP is prioritized such that when the mobile station is CMIP-enabled and is connected to a network that is PMIP-enabled mobile IP is controlled by the network, and
when the mobile device is connected to a network that is PMIP-enabled and moves to another network that is PMIP-enabled, mobility control is reclaimed by the mobile device and then assigned to the another network.

16. The apparatus according to claim 15 wherein the transceiver receives a mobility function request from one of the mobile device and the first network and responds with a mobility function assignment message to the other of the mobile device and the first network.

17. The apparatus according to claim 15 wherein the processor processes a mobility function assignment message based on the movement of a mobile device from a first network to a second network.

18. The apparatus according to claim 15 wherein the processor processes at least one of a mobility function assignment message and a message reclaiming control of the mobility function.

* * * * *